United States Patent [19]

Tonutti

[11] Patent Number: 5,177,945
[45] Date of Patent: Jan. 12, 1993

[54] RAKE HEAD SUPPORT SUITABLE FOR RIGHT HAND AND LEFT HAND FINGER WHEEL HAY RAKES

[75] Inventor: Carletto Tonutti, Tricesimo, Italy
[73] Assignee: Tonutti S.p.A., Italy
[21] Appl. No.: 792,430
[22] Filed: Nov. 15, 1991

[30] Foreign Application Priority Data

Jul. 24, 1991 [IT] Italy ............ UD91U000030

[51] Int. Cl.⁵ ............................................ A01D 81/00
[52] U.S. Cl. ........................................ 56/365; 56/366
[58] Field of Search ................... 56/365–369, 56/370

[56] References Cited

U.S. PATENT DOCUMENTS 2,727,347 12/1955 Fenster et al. ............... 56/365
3,948,028 4/1976 Reber ........................ 56/365
4,179,872 12/1979 Gerlinger ................... 56/366
4,785,614 11/1988 Schoenherr ............... 56/366 X Primary Examiner—Thuy M. Bui
Attorney, Agent, or Firm—Andrus, Sceales, Starke & Sawall

[57] ABSTRACT

The present invention regards a rake head able to support a right hand and left hand finger wheel hay rake. The structure has been designed to be versatile and there apply many different models of rake frames: the simple type which is a single reduced frame supported by the tractor three point hitch; the double V type placed onto a fixed or bolted frame on the right side or left side; the more complex type on a frame which has been assembled onto a trolley with oleodynamic control.

18 Claims, 3 Drawing Sheets

RAKE HEAD SUPPORT SUITABLE FOR RIGHT HAND AND LEFT HAND FINGER WHEEL HAY RAKES

The present invention regards a rake head able to support a right hand or left hand finger wheel rake. The structure has been designed so that this head can be versatile and therefore many models of rakes can be applied such as: a simple type which is a single rake on a reduced frame supported by the tractor three point hitch; the double type, assembled on a fixed or bolted frame on the right hand side or the left hand side; a complex type assembled on a frame on a trolley with oleo-dynamic control.

The object of this invention is the result of much studying of the problems in the agricultural sector and in particular, in the production of the implements for the movement of the cut grass or hay.

In this sector, there is the necessity to break down the machinery as much as possible so as to reduce spaces and in particular during transport from the factory to the customer. Also it is important to make sure that the parts of the machinery are standard and universal.

The subject of this present model is a support head for hay rakes that can be used in two versions: the simple version with only a plate as the base with holes on which to bolt the rake frame and which allows the movement of the support tube in the space; or in the version plate with vertical rod on which to anchor the shock absorbing springs and hold the supporting tube.

In substance, the supporting head of the rake foresees the anchoring of the support tube at one end with two orthogonal hinges so as to allow, on the other end, free movement.

These hinges are produced with two orthogonal pivots, one hinged into the base bracket and to the support fork onto the end of the tube—in a position which is parallel to the bracket—and the other perpendicular compared to the other but acting on the tube and its fork.

Therefore to support the other end of the tube, there is a very strong spring which will be anchored to a rod (if predisposed on the base plate) or at another fixed point of the frame of the machine.

The loose end of the support tube of the rake, obviously, will be so made as to be connected to the coupling piece of the tube by simply sliding the two tubes one inside the other and blocking with a pin or with other method of coupling with flange.

The present rake head can therefore easily be assembled onto simple rake frames and even those that are more complex with a result of being able to carry many different models of finger wheel rakes (up to 6 rake wheels).

For example, in the simplest case of support on the three point hitch of the tractor, it is enough to have a crossbar with pins at the end to block the lower points, while for the upper three point hitch, there is a support structure that allows the blockage in the center and at the same time the coupling with the crossbar which is underneath. On this, the coupling rod that carries the tube with free movements, which is supported by a spring to allow that the structure coupled to it can swing, during the transport or working phase of the hay rake.

The above mentioned characteristics will be clearer and evidenced and other characteristics will be mentioned in the following descriptions of certain models already realized in the enclosed drawings.

DETAILED DESCRIPTION OF THE INVENTION

Figure 1:
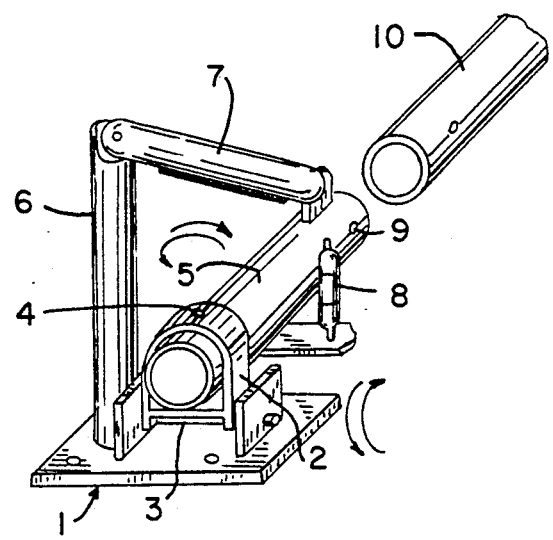
FIG. 1 shows a perspective view (front view) of the oscillating plate support suitable for the right and left hand sides for hay rakes with a tubular attachment.

As can be seen from the enclosed drawings, the support as per the invention is made up essentially of a base plate (1) (applicable on all suitable tubular frames or support bases) with a pair of suitable ears for hinging (3) (e.g. horizontal axle) the upside down "U" part (2) within which the end of the tube support (5) is hinged (4) (e.g. vertical axle) for the rake finger wheel arms (10).

The other end of the tube support (5) is held up in a vertical position by a bar, at least one spring (7) protected if possible), while in a horizontal sense with mechanical spacers (e.g. screw type) (8).

The tube (10) of the rake support structure is slid into the above mentioned end of the tube support (5) and blocked into position with a pin extending through a hole (9).

Figure 2:
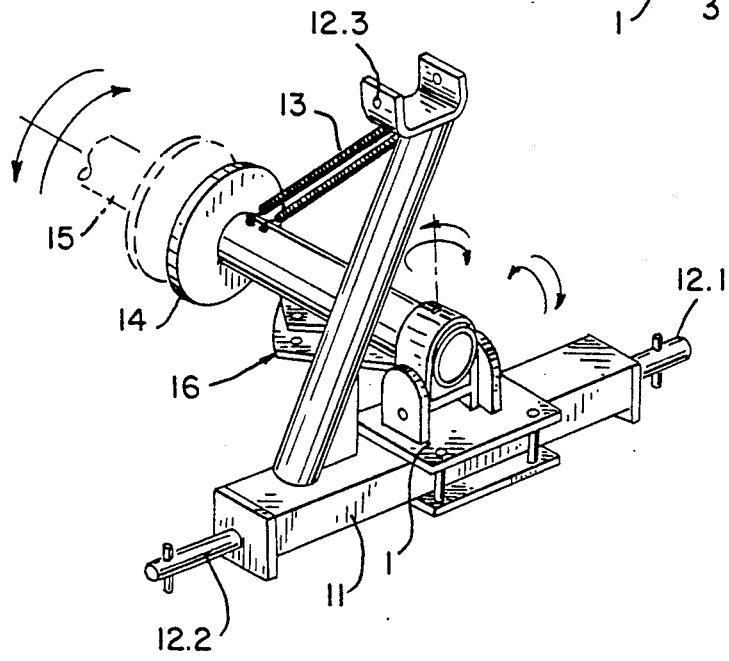
FIG. 2 shows a perspective view (front view) of the oscillating support suitable for the right and left hand sides predisposed for tractor three point hitches with attachment to the hay rake by means of a flange.
Figure 4:
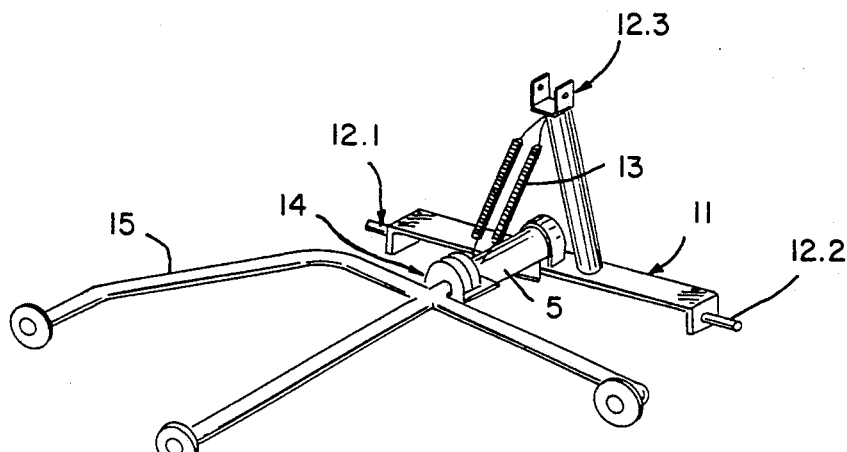
FIG. 4 shows a perspective view (back view) of the oscillating support of FIG. 2 complete with rake arms which carry rake wheels.

In a second version, shown in FIGS. 2 and 4, the support suitable for both sides is assembled onto a crossbar (11) with attachment pivots (12.1) and (12.2) and on this, the bar for the three point hitch (12.3) of the tractor is placed. This technical solution foresees the attachment of the arms (15), which carry the rake wheels, being flanged, with a side guide plate (14) to which the flanged end of the arm is mounted.

To obtain the desired horizontal position, a plate (16), which has many holes, is located adjacent the tube the support (5). The tube support (5) is blocked to the plate (16) by means of the holes provided in the plate (16), in its desired position. The springs (13) always have the function of shock absorbers to avoid bumps during the working and transport phases.

The end of the tube support (5) is connected to the base plate (1) by two orthogonal axles, to accommodate the orientation of the other end, which will be positioned with the help of an adjustable member (8 or 16) and will be by an arm and spring (7 or 13).

Figure 3:
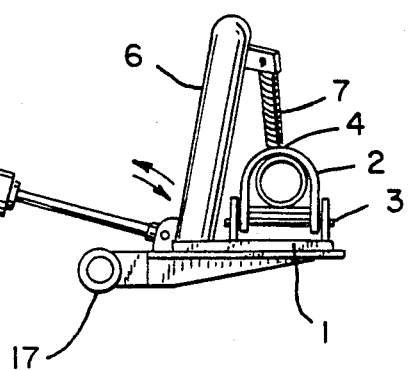
FIG. 3 shows a side view of an oscillating support suitable for both right and left hand sides assembled on a hinged base actioned and positioned by oleodynamic cylinders.

In another model FIG. 3, the support base plate (1) can be fixed to a fixed or hinged platform (17), to an arm carrying rake wheels, assembled on rubber wheels, or simply held up.

The platform (17) is hinged according to an axle and can be moved at an angle by the oleodynamic cylinder (18) which is actioned directly by the tractor driver from the tractor seat.

Figure 5:
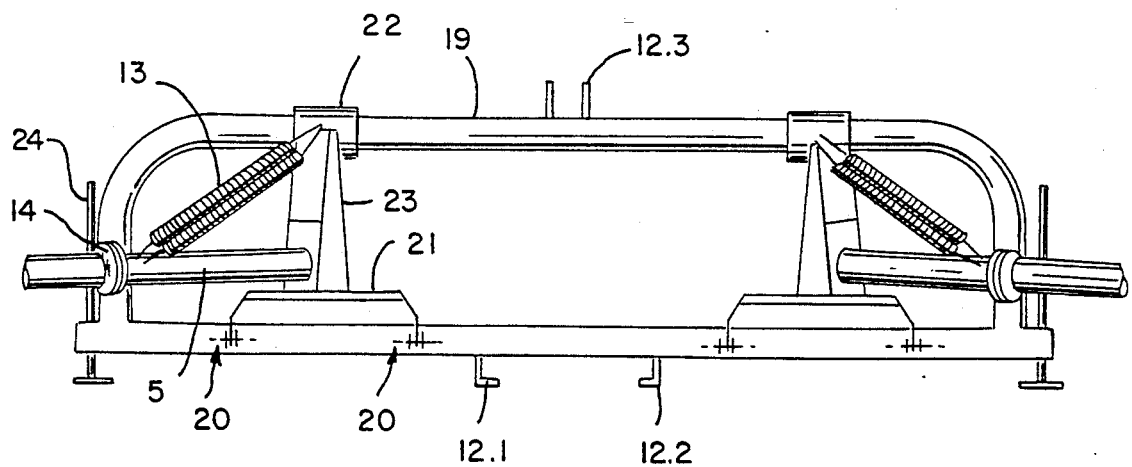
FIG. 5 shows a back view of another solution of the support carrying rake head applied on a tubular frame, transportable and carried by the three point hitch of the tractor or pulled by a trolley.

FIG. 5 illustrates another method of application of an oscillating rake head carrier fixed on both the right and left hand side of a tubular frame (19) with a bar (22) and pivots (20). On the pivot points of the pivots (20), the base (21) of the head (23) is hinged complete with pins (13) that hold the oscillating axle (5) of a flange type (14). The frame has adjustable side stands (24) for parking of the machine.

Figure 6:
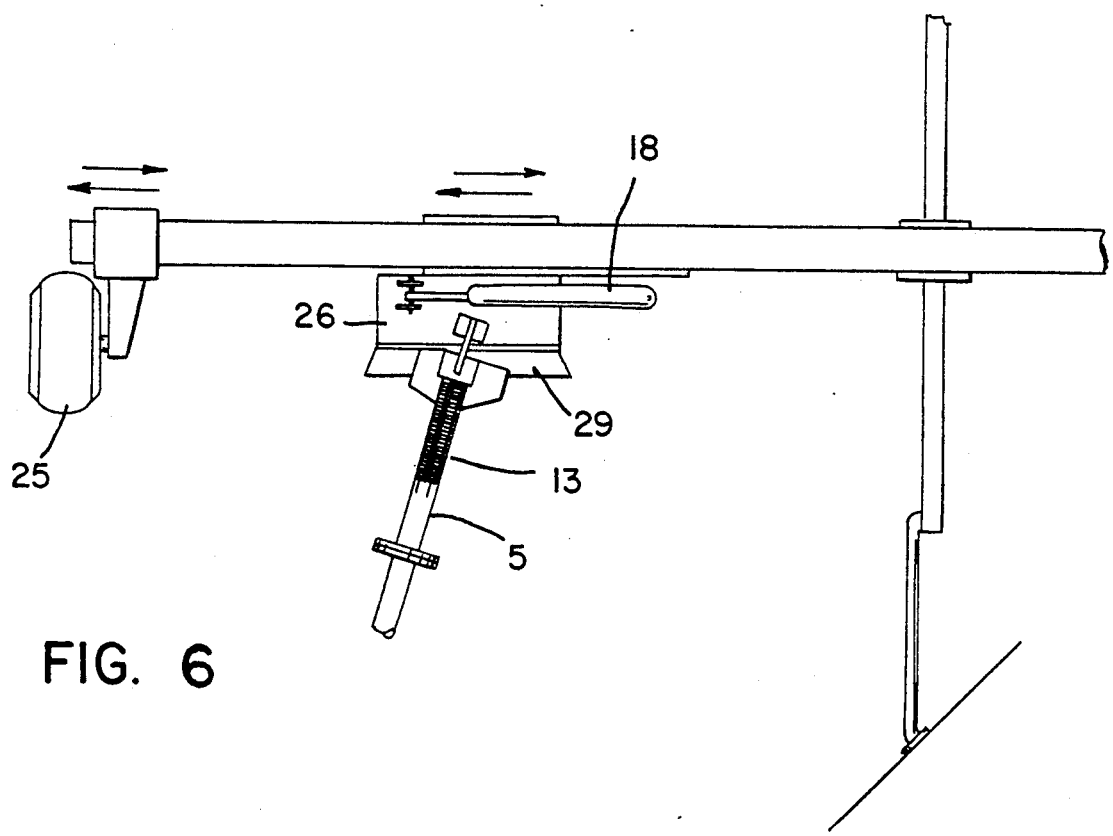
FIG. 6 shows a partial drawing with just the view of the left hand side of a frame on a trolley where the working widths can be adjusted on both sides.
Figure 7:
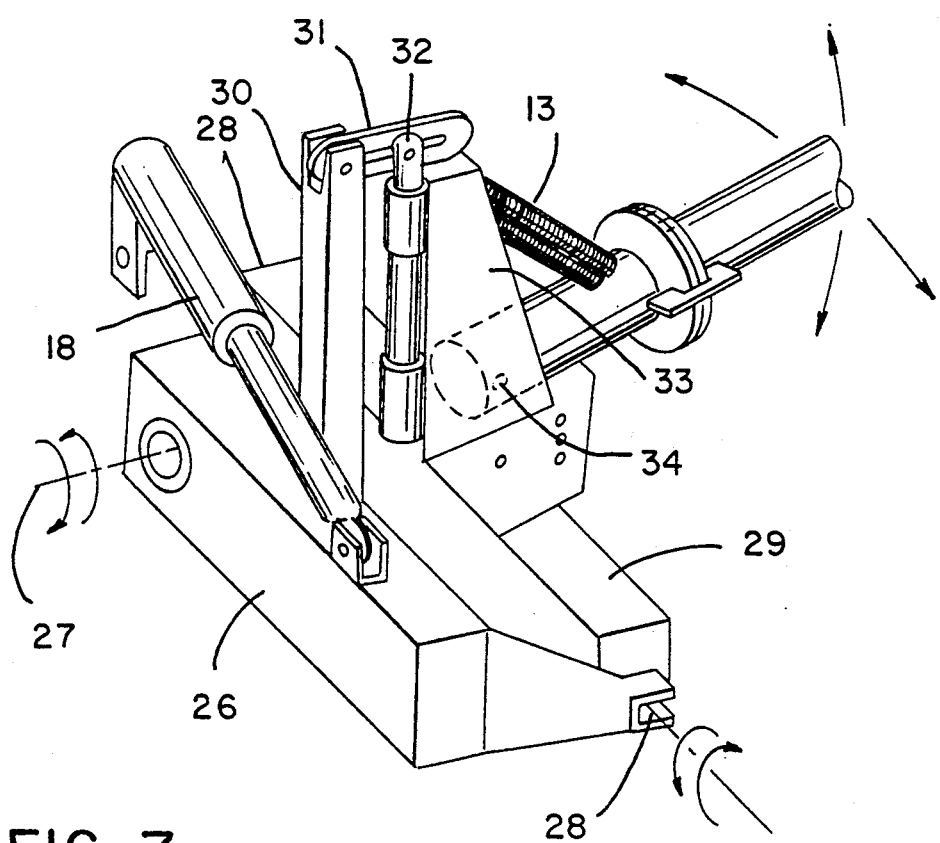
FIG. 7 shows a perspective front view of the complete assembly of the rake head shown in FIG. 6.

Another method of applying the oscillating head is shown in FIGS. 6 and 7, in which the head is assembled on a frame with ground wheels (25), and the head support (33) is adjustable in width on the frame.

This solution has a platform (26) which is fixed onto the axle (27) of the frame and is actioned by an oleodynamic cylinder (18) which controls its rotation of the axle.

On the platform (26) there are two hinge points (28) on the axle on which will be fixed another oscillating platform (29) to which a head support (33) is mounted by means of an adjustable plate base. The oscillating platform (29) is fixed orthogonally with a vertical axle (32) engaged with a slotted bracket (31) pivotably mounted to the upper end of a support (30), fixed onto and extending upwardly from the platform (26).

The head carrying rake or tube support (5) of this model is universal hinged (34) on the head support (33) and held by two springs (13). The rake or tube support (5) is adjustable in the space between three orthogonally hinged axles (27-28-32) and another oscillating axle provided by the hinge (34) on the tube support (5) with the springs (13).

As an expert can well understand, various different solutions can be attached to the head described always remaining in the characteristics of the invention.

These and other solutions are all possible without exiting from the invention.

I claim:

1. A support assembly for movably mounting a rake assembly to a frame, comprising:
   a base member mounted to the frame;
   a support member to which an arm associated with the rake assembly is adapted for connection; and
   a pivoting mounting arrangement interposed between the base member and the support member for providing pivoting movement of the support member, and thereby the rake assembly, about a substantially horizontal pivot axis.

2. The support assembly of claim 1, further comprising a spring acting on the support member for biasing the support member upwardly about the pivot axis.

3. The support assembly of claim 2, wherein the spring is connected toward the upper end of an upstanding member, and to the support member at a location spaced from the pivot axis.

4. The support assembly of claim 3, wherein the upstanding member is mounted at its lower end to the frame and wherein the frame and upstanding member comprise an assembly adapted for mounting to a three-point hitch associated with a tractor.

5. The support assembly of claim 3, wherein the upstanding member is mounted at its lower end to the base member.

6. The support assembly of claim 3, wherein the upstanding member comprises a rake head support (33) mounted to a platform (29) which is pivotably mounted about the pivot axis to the base member.

7. The support assembly of claim 1, wherein the base member is mounted for movement about a second pivot axis to the frame, and further comprising an extendible and retractable mechanism interconnected between the base member and the frame for providing pivoting movement of the base member about the second pivot axis.

8. The support assembly of claim 7, wherein the extendible and retractable mechanism comprises a hydraulic cylinder assembly having an extendible and retractable rod.

9. The support assembly of claim 1, wherein the pivoting mounting arrangement further provides pivoting movement of the support member, and thereby the rake assembly, about a substantially vertical axis.

10. The support assembly of claim 9, wherein the pivoting mounting arrangement comprises a pair of upstanding ears mounted to the base member, an upside-down U-shaped bracket pivotably mounted about the substantially horizontal pivot axis to the pair of ears, and a connection arrangement pivotably mounting an end of the support member to the U-shaped bracket for pivoting about the substantially vertical axis.

11. The support assembly of claim 10, further comprising an adjustable mechanical arrangement interconnected between the base and the support member for fixing the position of the support member relative to the substantially vertical axis.

12. The support assembly of claim 11, wherein the adjustable mechanical arrangement comprises one or more mechanical screw-type spacers.

13. The support assembly of claim 11, wherein the adjustable mechanical arrangement comprises a plate having a plurality of holes through which the support member is blocked in position.

14. The support assembly of claim 9, further comprising a rake head support member movable to varying positions on a base for fixing the position of the support member about the substantially vertical axis.

15. The support assembly of claim 1, wherein the support assembly is mounted to the frame so as to be movable thereon to adjust the working width of the rake.

16. The support assembly of claim 1, wherein the pivoting mounting arrangement comprises a platform (29) mounted for pivoting movement about the substantially horizontal pivot axis to the base member and a rake head support mounted to the platform, wherein the support member is connected to the rake head support.

17. The support assembly of claim 16, further comprising a vertical axle (32) connected to the platform, wherein the upper end of the axle is movably mounted in a slotted bracket (31) interconnected with the base member, to accommodate pivoting movement of the platform (29) relative to the base member about the substantially horizontal pivot axis.

18. The support assembly of claim 17, wherein the slotted bracket is pivotably mounted to a support (30) connected to the base member.

* * * * *